United States Patent
Yano et al.

(10) Patent No.: US 6,866,393 B2
(45) Date of Patent: Mar. 15, 2005

(54) REFLECTIVE LIQUID CRYSTAL DISPLAY

(75) Inventors: Shuuji Yano, Osaka (JP); Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 345 days.

(21) Appl. No.: 09/898,060

(22) Filed: Jul. 5, 2001

(65) Prior Publication Data

US 2002/0008816 A1 Jan. 24, 2002

(30) Foreign Application Priority Data

Jul. 5, 2000 (JP) .................................... 2000-203944

(51) Int. Cl.[7] .............................................. F21V 7/04
(52) U.S. Cl. ........................ 362/31; 362/561; 349/63
(58) Field of Search ........................... 362/31, 561, 26, 362/27, 560; 385/50, 901; 349/65, 62, 63

(56) References Cited

U.S. PATENT DOCUMENTS

| | | | |
|---|---|---|---|
| 6,196,692 B1 | 3/2001 | Umemoto et al. ............ 362/31 |
| 6,199,995 B1 | 3/2001 | Umemoto et al. ............ 362/31 |
| 6,340,999 B1 * | 1/2002 | Masuda et al. ............... 349/63 |
| 6,380,995 B1 * | 4/2002 | Kim ............................. 362/31 |
| 6,507,378 B1 * | 1/2003 | Yano et al. .................... 362/31 |

FOREIGN PATENT DOCUMENTS

| | | | |
|---|---|---|---|
| EP | 0 787 942 A2 | 8/1997 | |
| EP | 0 957 392 A1 | 11/1999 | |
| JP | 11-250715 | 9/1999 | ............. F21V/8/00 |
| JP | 11-306829 | 11/1999 | ............. F21V/8/00 |
| JP | 11-326903 | 11/1999 | ......... G02F/1/1335 |

OTHER PUBLICATIONS

Patent Abstract of Japan, 11–250715, Sep. 17, 1999.
Patent Abstract of Japan, 11–306829, Nov. 5, 1999.
Patent Abstract of Japan, 11–326903, Nov. 26, 1999.

* cited by examiner

*Primary Examiner*—Thomas M. Sember
*Assistant Examiner*—Bao Q. Truong
(74) *Attorney, Agent, or Firm*—Sughrue Mion, PLLC

(57) ABSTRACT

A reflective liquid crystal display (LCD) is constituted by a light pipe which emits incident light from an incident side from the other surface of its upper and lower surfaces through light emitting means formed on the one of them, a plane light source device with a light source arranged on one or more sides of the light pipe, and a liquid crystal display (LCD) panel having a reflective layer. The light emitting side of the plane light source device and the visual recognition side of the LCD panel are bonded to each other through an adhesive layer having a refractive index lower than that of the light pipe.

8 Claims, 2 Drawing Sheets

REFLECTIVE LIQUID CRYSTAL DISPLAY

BACKGROUND OF THE INVENTION

1. Field of the Invention

This invention relates to a front-light type reflective liquid crystal display (LCD) which is excellent in the using efficiency of light, bright and easy to see.

The present application is based on Japanese Patent Application No. 2000-203944, which is incorporated herein by reference.

2. Description of the Related Art

A front-light type reflective LCD is previously known which is provided with a plane light source device of a sidelight type light pipe, which permits visual recognition in the darkness, on a visual recognition side (Unexamined Japanese Patent Publications Nos. Hei. 11-250715 and 11-306829) However, only arrangement of the plane light source device on the side of visual recognition increases interface reflection owing to existence of an air interface and the reflected light overlaps a displayed image on a liquid crystal display (LCD) panel to cause white blooming and reduction in the contrast. In order to obviate such incontinence, another reflective LCD has been proposed which is provided with the plane light source device through an adhesive layer (Unexamined Japanese Patent Publication No. Hei. 11-326903). However, the conventional reflective LCDs, particularly those having a screen size having 3 inch or more or making color display, have a problem that the brightness is lower at a farther point from the light source, thus producing variations of light and shade.

SUMMARY OF THE INVENTION

This invention intends to provide a front-light type reflective liquid crystal display (LCD) which suppresses changes in the luminance in a lighting mode and is excellent in the visual recognition (or visibility) such as contrast and brightness.

This invention provides a reflective liquid crystal display (LCD) characterized by comprising a light pipe which emits incident light from an incident side from the other surface of its upper and lower surfaces through a light emitting means formed on the one of them; a plane light source device with a light source arranged on one or more sides of the light pipe; and a liquid crystal display (LCD) panel having a reflective layer, wherein the light emitting side of the plane light source device and the visual recognition side of the LCD panel are bonded to each other through an adhesive layer having a refractive index lower than that of the light pipe.

In accordance with this invention, bonding processing using the adhesive layer prevents intervention of an air interface so that the reflective LCD suppresses reflection at the lower surface of the light pipe so that its reflected light does not overlap a displayed image on the LCD panel, thus preventing white blooming and reduction in contrast and hence realizing good visibility. In addition, using the adhesive layer having a refractive index lower than that of the light pipe suppresses variations in the luminance in a lighting mode. This is based on the investigation of the problem concerning the conventional technique.

Conventionally, it was considered that suppressing reflection at the bonding interface between the adhesive layer and the light pipe or/and the LCD panel is profitable to improve the luminance and hence making a difference in the refractive index as small as possible is more advantageous to improve the luminance. However, in this case, the incident light from the side of the light pipe and its transmission light is apt to pass through the adhesive layer owing to reduced difference in the refractive index at the interface and to be incident on a color filter layer and a polarizer. The incident light is apt to be absorbed. Incidentally, generally, the polarizer absorbs about a half of the incident light. Therefore, owing to the absorption loss, the light transmitted rearward is greatly reduced. Probably, this disadvantageously increases variations in the luminance on a large-sized screen and color screen.

On the other hand, in accordance with this invention, the above incident light is apt to reflect totally owing to the difference in the refractive index. In addition, the light with a larger incidence angle to the adhesive layer which is apt to be transmitted rearward is likely to suffer the total reflection. Therefore, the incident light and its transmission is apt to be shut in the light pipe, thereby improving the transmission efficiency to rearward. The light is difficult to be incident on the polarizer, color filter layer, etc. As a result, the variations in the luminance is reduced so that the uniformity of the luminance on the screen is improved. Thus, a front-light reflective LCD which is excellent in the uniformity and display quality such as contrast.

Features and advantages of the invention will be evident from the following detailed description of the preferred embodiments described in conjunction with the attached drawings.

DETAILED DESCRIPTION OF THE PREFERRED EMBODIMENTS

Figure 1:
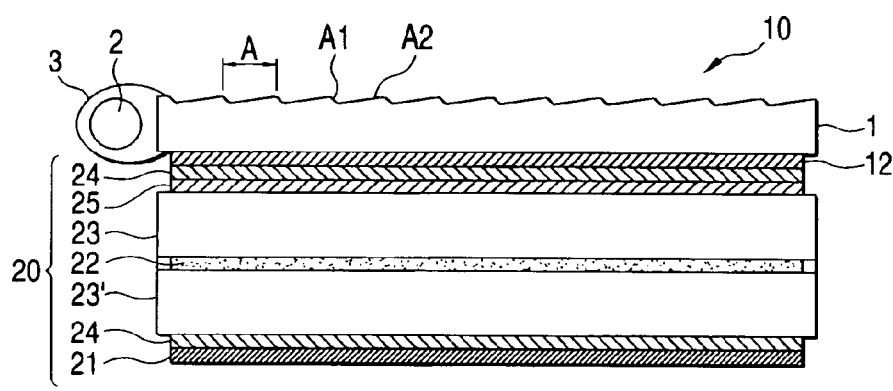
FIG. 1 is a sectional view of an embodiment.
Figure 2:
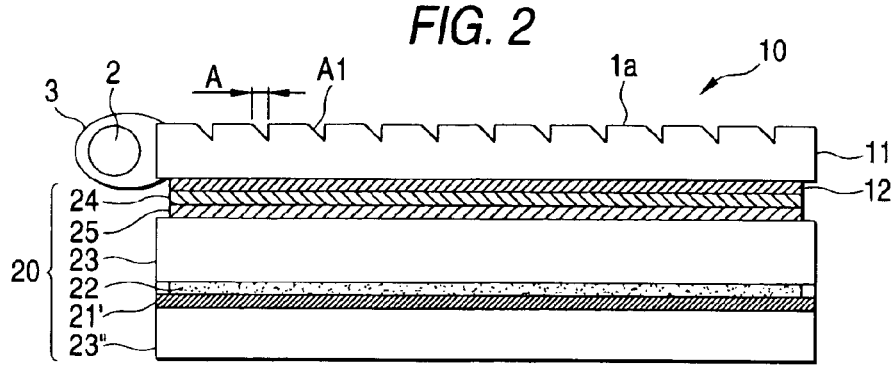
FIG. 2 is a sectional view of another embodiment.

The reflective LCD reflective liquid crystal display (LCD) according to this invention includes a light pipe which emits incident light from an incident side from the other surface of its upper and lower surfaces through a light emitting means formed on the one of them; a plane light source device with a light source arranged on one or more sides of the light pipe; and a liquid crystal display (LCD) panel having a reflective layer, wherein the light emitting side of the plane light source device and the visual recognition side of the LCD panel are bonded to each other through an adhesive layer having a refractive index lower than that of the light pipe. An example of the reflective LCD is shown in FIGS. 1 and 2. In FIGS. 1 and 2, reference numerals 1, 11 denote a light pipe; 2 a light source; 10 a plane light source device; 20 a LCD panel having a reflective layer; and 12 an adhesive layer. Further, symbol A denotes a light emitting means for the light pipe; 21 a reflective layer; 21 a reflective layer; 21' a reflective layer serving as an electrode; 22 an LCD layer; 23, 23', 23" a cell plate; 24 a polarizer; and 25 a light diffusive layer.

The light pipe may be any means in which incident light from an incident side is emitted from the other surface of upper and lower surfaces thereof through a light emitting means formed on the one surface thereof. Generally, as illustrated, the light pipe is a transparent plate having an upper surface, a lower surface opposite thereto, and an incident side of the sides between the upper and lower surfaces. As illustrated, the light pipe may have a uniform thickness type, otherwise may be a wedge type in which the thickness of an opposite side to the incident side is thinner than that of the incident side. Reduction in the opposite end is more convenient from the point of view of weight reduction and improvement in the incidence efficiency of incident light or its transmission light from the incident side.

The light emitting means, which is formed on the one of the upper and lower surfaces, generally the upper surface because the LCD is a front-light type of visual recognition through the light pipe, may be any appropriate means representative of the above light incidence characteristic. Preferably, the light pipe has a configuration in which the incident light from the incident side is effectively emitted from the lower surface with good directivity and no dispersion through the light emitting means on the upper surface, particularly from the point of view of good visibility on the front and its vicinity, as seen from FIG. 3, has a configuration in which where the light incident from the incident side or its transmission light (bold arrow) is emitted from the lower surface, the direction $\theta$ indicative of the maximum strength K of the emitted light is within 30° from the normal line H to the reference plane of the lower surface.

In view of preventing reduction in the contrast owing to the overlapping between the leakage light on the upper surface and displayed image by the emitted light, the maximum strength of the leakage light from the upper surface in the direction within 30° to the above normal line H is preferably 1/5 of the above maximum strength K on the lower surface. The leakage light from the upper surface in the above direction is apt to overlap the reflected light through the reflective layer of the emitted light from the lower surface exhibiting the maximum strength K. Where the ratio in the maximum strength of the leakage light on the upper surface to the emitted light on the lower light is large, the strength of the displayed image is easily lowered relatively, and the contrast is easily reduced.

Figure 3:
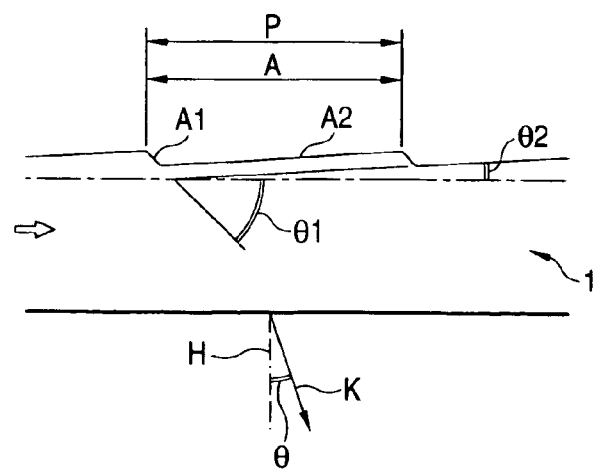
FIG. 3 is a view for explaining light emitting means.

From the standpoint of improvement of the display quality such as brightness and contrast in the reflective LCD, the light pipe has a preferable structure in which said $\theta$ is within 28°, particularly 25°, more particularly 20° as seen from FIG. 3, in the vertical plane (section on the drawing) to both reference planes of the incident side surface and lower surface. Further, the light pipe is a preferable structure in which assuming the incident side being in a negative direction with respect to the normal line H, the strength L of the leakage light on the upper surface at the same angle as the direction of the maximum strength K is 1/10 or less, particularly 1/15, more particularly 1/20. Since the pertinent leakage light overlaps the direction of direct reflection of the light exhibiting the maximum strength K, where the value of L/K is large, the strength of the displayed image is relatively lowered to reduce the contrast.

From the standpoint of attaining the direction of the maximum strength K and characteristic of the maximum strength K/the leakage light strength L, etc., the light emitting means is preferably a light emitting means A having an optical path converting plane A1 opposite to the incident side (origin of the arrow) as seen, particularly having a plurality of asperities, particularly a repetition thereof having the optical path converting plane A1 with a tilt angle of 35–48° from the lower reference plane.

The repetitive structure of the asperity can be formed of convexities or concavities each having equal sides. From the standpoint of the using efficiency of light and light emission with good directivity from the supper surface in the front (or vertical) direction of the light inverted from the emitted light from the lower surface, the structure of asperities is preferably a repetitive structure in which as seen from FIG. 2, the asperities which are triangular in section, which have the optical path converting planes A1 sloping down from the incident side (origin of arrow) toward the opposite side at the tilt angle from the lower reference plane is 35–48° ($\theta 1$), are formed with regular pitches, and the flat face 1a with the tilt angle of 0–10° formed from the upper surface of the light pipe is arranged between the pitches. The light pipe is preferably a repetitive structure of prism-shaped asperities each composed of the optical path converting plane A1 and a long side plane A2 ($\theta 2$) at the tile angle of 0–10° as seen from FIG. 1.

Incidentally, the asperities described above are formed of bumps or depressions. From the standpoint of making the optical path converting plane A1 difficult to crack to improve its endurance, the light emitting means composed of depressions is preferable. The asperities of the above optical path converting plane A1 reflect the incident light from the incident side to supply it to the lower surface. In this case, with the tilt angle $\theta 1$ of 35–48°, the incident light from the incident side or its transmission light is reflected with good verticality to the lower surface so that the emitted light from the lower surface having the maximum strength K in the direction within 30° from the normal line H. Thus, the emitted light (illumination light) with excellent directivity can be acquired through the reflective layer of the LCD panel, thus realizing bright display.

From the standpoint of directivity toward the front, the preferred tilt angle $\theta 1$ on the optical path converting plane is 38–45°, preferably 40–44° in view of the fact that the total reflection condition of the light transmitted through the light pipe based on the refraction due to the Snell's Law is ±41.8° at the refractive index of e.g. 1.5. A part of the light which does not satisfy the total reflection condition but passes on the optical path converting plane to become leakage light is emitted at an angle of 60° or more to the front and hence is difficult to influence the visibility in the vicinity of the front direction, but at the tilt angle of $\theta 1$ exceeding 48°, the leakage light is apt to increase. This is disadvantageous in the efficiency of using light.

On the other hand, the long side plane A2 or flat plane 1a between the optical path converting planes A1 intends to reflect the incident light to be supplied to the optical path converting plane and also invert the light reflected from the optical path converting plane through the reflective layer of the LCD panel and transmit it from the upper surface, and further intends to reflect the external light in a reflection mode through the reflective layer and transmit the reflected light from the upper surface. In view of such an intension, the tilt angle $\theta 2$ of the long side plane A2 or the angle $\theta$ of the flat plane 1a is preferably 0–10°.

The tilt angle $\theta 2$ on the long side plane may be 0° (horizontal plane), but preferably exceeds be 0° so that when the transmission light incident to the long side plane is reflected and supplied to the optical path converting plane, the transmission light can be transformed into parallel light and the directivity of the reflected light through the optical path converting plane can be enhanced. This is advantageous for the display. On the other hand, if the tilt angle $\theta 2$ exceeds 10°, the rate of the incidence of light to the long side plane is reduced so that the supply of light to the opposite end is insufficient. Thus, the light emission is apt to become imbalance. The degree of changing the light path due to refraction increases so that the light amount in the front direction is reduced. This is disadvantageous for the display.

Low-profiling of the sectional shape of the light pipe on the opposite end becomes difficult. The amount of light to the light emitting means is reduced, thereby lowering the light emission efficiency.

From the standpoint of the above performances such as the focusing of the emitted light, an increase in the light amount in the front direction and suppression of the leakage light based on the conversion of the transmission light into the parallel light, the preferred angle of the long side plane is 8° or less, particularly 5° or less. As described above, by adjusting the tilt angle of the long side plane or flat plane from the optical path converting plane, the emitted light is given directivity so that the light is emitted in the vertical direction or at an angle approximately equal to 90° from the lower surface.

From the standpoint of the visibility of the displayed image through the long side plane of the light pipe, the preferable angle difference of the tilt angle θ2 of the long side plane is within 5°, particularly 4°, more particularly 3° over the entire light pipe. The difference in the tilt angle θ2 between the nearest long side planes is within 1°, particularly 0.3°, more particularly 0.1°. This suppresses the influence by the difference in the tilt angle θ2 for the displayed image on the long side plane from which the light permeate. Where the permeating angle greatly differs according to the positions of the long side planes, an unnatural image will be created. Particularly, a great difference of deflection between the permeated images in the vicinity of the adjacent pixels results in a very unnatural displayed image.

The difference in the tilt angle θ2 assumes that the tilt angle of the long side plane is within 10°. Specifically, such a small tilt angle θ2 is set to suppress the deflection of the displayed image due to refraction within a permissible value when the light permeate through the long side plane. This intends to set the observing point in the vicinity of the vertical direction so that the optimum direction of visual recognition in the optimized LCD is not changed. When the displayed image is deflected, the optimum direction of visual recognition deviates from the vicinity of the vertical direction. Where the degree of deflection is great, the direction of deflection approaches the emitting direction of the leakage light from the upper surface of the light pipe so that the displayed image is apt to suffer from the influence such as reduction in the contrast. The condition that the tilt angle θ2 of the long side plane is within 10° includes that the influence such as the dispersion of transmitted light is negligible.

From the standpoint of acquiring a bright displayed image, the incidence efficiency of external light is preferably excellent, and efficiency of transmission and emission of the displayed image by the LCD panel are preferably excellent. In view of this matter, the asperities are preferably formed to provide a prism shape or sectional triangle having the projected area of the long side plane or flat plane on the lower reference plane is preferably five times, particularly ten times, more particularly fifteen times as large as the area of the optical path converting plane. In this way, the major part of the displayed image by the LCD panel can be transmitted through the long side plane or flat plane.

Additionally, when the displayed image is transmitted by the LCD panel, the displayed image incident to the optical path converting plane is reflected to the incident side and hence is not emitted from the upper surface, or otherwise deflected and emitted in a greatly different direction from the displayed image which has passed the long side plane on the opposite side with respect to the normal line to the lower surface, and so does not almost influence the displayed image passed through the long side plane. Therefore, in order to prevent an unnatural displayed image from being created because of shortage of transmission of the light for display, it is preferred that the area of the pixel overlapping the optical path converting plane is decreased to assure sufficient light transmittance through the long side plane.

Generally, in view of the fact that the pixel pitch of the LCD panel is 100–300 μm, the optical path converting plane preferably have a length of 40 μm or less on the basis of the projection width on the lower reference plane. As the projected width of the optical path converting plane decreases, a more sophisticated technique is required to form it. Where the apex of the asperity has roundness with a radius of curvature of a prescribed or more value, the scattering effect appears which is apt to be a cause of a disorder of the displayed image. Further, generally, the coherent length of a florescent tube is generally about 20 μm so that reduction in the projected width of the optical path converting plane is likely to deteriorate the display quality owing to diffraction. For this reason, the preferable projection width of the optical path converting plane is 1–20 μm particularly 5–15 μm.

For the reasons described above, the distance between the optical path converting planes is preferably large. However, since the optical path converting plane serves as a substantial emitting portion of light from the incident side as described above, if the distance is too large, the illumination during lighting is coarse, thereby providing an unnatural displayed image. In view of those factors, as seen from FIG. 3, the repetitive pitch P of the asperities with the prism-shape or triangular shape in section is preferably 50 μm–1.5 mm. In this case, the pitch may be constant, or may be irregular like a random pitch or a random or irregular combination of a prescribed number of pitch units.

The light emitting means of asperities may interfere with the pixels on the LCD panel to create moiré. The moiré can be prevented by adjusting the pitch of the asperities. As described above, the pitches of the asperities have a preferred range. Therefore, the measure for solving the case where the range of the pitches creates the moiré is problematic. In this invention, the moiré can be preferably prevented in such a manner that the asperities are formed in a state tilted from the reference plane of the incident side so that the asperities can be arranged to cross the pixels. In this case, if the tilt angle is too large, a deflection occurs in the reflection through the optical path converting plane so that a great deflection occurs in the direction of the emitted light. This increases the anisotropy in the light emitting strength in the direction of light transmission of the light pipe, thus reducing the using efficiency of light. This is apt to be a cause of deteriorating the display quality.

For the reason described above, the direction of arranging the asperities with respect to the reference plane of the incident side, i.e. the tilt angle of the ridge direction of the asperities is preferably within ±30°, particularly ±28°, more particularly ±25°. Incidentally, the mark ± means the direction of tilting with respect to the incident side. Where the resolution of the LCD panel is too low enough to create the moiré, or the moiré is negligible, the direction of arranging the asperities is more preferable as it is more parallel to the incident side.

The light pipe can be formed in any shape as described above. Also where it is wedge-shaped, it may be formed in any shape. It can be formed in any suitable plane shape such as a linear face or curved face. The optical path converting plane or prism-shaped asperities which serves as the light emitting means may be also formed in any plane shape such as the linear plane, uneven plane or curved plane. Further, the asperities may be a combination of different shapes as well as different pitches. The asperities may be a series of projections or depressions with a continuous ridge. The asperities may be intermittent projections or depressions which are discontinuously arranged in a ridge direction at regular intervals.

The lower surface or incident side of the light pipe should not be limited to a specific shape but may be formed in any shape. Generally, the lower surface is preferred to be as smooth and flat as possible, and the incident side is vertical to such a lower surface. The incident side is desired to be formed in a shape corresponding to the outer periphery of a light source having a shape of e.g. a curved depression so that the efficiency of light incidence can be improved. The structure of the incident side which is communicated with the light source through an introducing portion may be adopted. This introducing portion may be formed in any shape according to the light source.

The light pipe can be made of any suitable transparent material according to the wavelength range of the light source. For example, in a visible light range, it may be made of transparent resin such as acryl resin, polycarbonate resin, norbornene resin and epoxy resin, or glass. A preferred light pipe is the light pipe with no birefringence or small birefringence.

The light pipe can be formed by any suitable technique such as cutting. In view of mass production, preferred methods are a method of pressing thermosetting resin on a mold which can be formed in a prescribed shape under heat, thereby duplicating the shape, a method of filling heated and molten thermoplastic resin or resin made fluid by heat or solvent in the mold which can be formed in a prescribed shape, a method of filling or pouring liquid resin which can be polymerized by heat, ultraviolet rays or radiation.

The light pipe may be a laminate of similar or different material members such as a light conductive portion performing light transmission on which a sheet with a light emitting means such as prism-shaped asperities is bonded, but may not be an integral single member of a single kind of material.

The Thickness of the light pipe can be determined as required according to the sizes of the light pipe and light source according to a using object. The general thickness of the light pipe to manufacture the LCD is 10 mm or less, particularly 0.1–5 mm, more particularly 0.3–3 mm. From the standpoint of attaining bright display, the more preferred light pipe has a full light transmittance of the incident light in the vertical direction, particularly vertical incident light from the lower surface to the upper surface is 90%, particularly 92%, more particularly 95%, and a haze value of 30% or less, particularly 15% or less, more particularly 10% or less.

The plane light source device can be formed in such a manner that the light source 2 is arranged on the incident side of the light pipe 1 or 11 as seen from the figures. The light source may be any suitable light source. Generally, the preferred light source is a linear light source such as a (cold or hot) cathode ray tube, an array body of light-emitting diodes arranged linearly or in plane, or a light source with the means for converting the point light source into a linear light emitting state with constant or indefinite intervals. In view of low power consumption, endurance, etc. the cold cathode ray tube is particularly preferred. The light source(s) can be arranged on the one or two sides of the light pipe.

The plane light source device can be provided as an assembly having any suitable assisting means such as a light source holder 3 which encircles the light source in order to guide the light scattered light from the light source 2 to the incident side of the light pipe as required. The light source holder may be generally a resin sheet or metallic foil equipped with high reflectivity metallic thin film. Where the light source holder is boned to the end of the light pipe through adhesive, the light emitting means can be omitted at the bonding portion.

The reflective LCD panel can be formed by assembling a LC cell with an electrode serving as a LC shutter and its driving device, a reflective layer, and other components inclusive of a polarized plate, a compensating phase shift plate, light-diffused layer which are formed as required. In this invention, the reflective LCD panel should not be particularly limited as long as it has the reflective layer, but formed in an ordinary format as seen from the figures. Incidentally, the electrode such as a transparent electrode is not illustrated.

The LC cell constituting the LCD panel should not be particularly limited. For example, as regards the orienting format of LC, it may be a TN LC cell or STN LC cell; a vertical oriented cell or HAN cell; a twisting system such as an OCB cell or non-twisting system; or a guest-host system or ferromagnetic LC system. As regards the LC driving system, it should not be particularly limited, but may be any driving system such as an active matrix system or passive matrix system. Further, as regards the cell plate and electrode, they may not be a transparent plate or transparent electrode in the area where illumination light or display light are not required to pass, but may be an opaque body.

The reflective LCD panel necessarily requires a reflective layer to be arranged. However, its arranging position can be determined optionally. For example, it may be provided outside the LC cell like the reflective layer 21 as illustrated in FIG. 1. It may be provided inside the LC cell like the reflective layer 21' as illustrated in FIG. 2. The reflective layer can be formed as an applied layer containing high reflectivity metallic power of e.g. Al, Ag, Au, Co, Cr, etc., in binder resin; a metallic thin film deposited by evaporation; a reflective sheet which supports the applied layer or deposited metallic layer using a substrate; or an ordinary reflective layer such as a metallic foil. As seen from FIG. 2, where the reflective layer 21' is provided inside the LC cell, the reflective layer can serve as an electrode of a high conductivity material such as the above high reflectivity metal. It may be formed as well as the transparent electrode or otherwise may be formed of the transparent electrode.

The LCD panel is provided with a polarizer 24 at the one side of both sides as required in order to control the display light as shown in FIGS. 1 and 2. The polarizer should not be particularly limited, but may be any suitable material. For example, it may be a polarizing film such as a polyvinylalcohol film, partial hormalized polyvinyl alcohol film, a drawn film of the hydrophilic high polymer film such as ethylene-vinylacetate copolymer partial saponificated film adsorbed with a dichotic material such as iodine or dichotic dye; or a polyene orienting film such as dehydrate of polyvinyl alcohol or de-hydrochloric-acid of polyvinylchloride.

Further, the polarizer may be used which is equipped with a transparent protective layer of a laminate layer of resin applied layer of film on the single or both surfaces of the polarizing film for the purpose of protection such as keeping water-resistance. The polarizer may be used which includes a polarizing layer of LC polymer or LC polymer-containing polymer. The polarizer with high transmittance is preferably used from the standpoint of bright display.

On the other hand, in order to compensate for dependency of birefringence on the wavelength to improve the visibility, the above compensating phase shift plate is arranged between the polarizer on the visual recognition side or/and rear side and the LC cell. The compensating phase shift plate may be any suitable plate such as a drawn film of various kinds of resin, that including an oriented layer of LC polymer, or that made of inorganic crystal according to the phase shift characteristic. The compensating phase shift plate may be a superposed layer composed of one or two or more phase shift layers. The above drawn film may be that subjected to various kinds of drawing such as single-axis drawing at a free end or fixed end, two-axis drawing, drawing including molecular orientation in a thickness direction.

On the other hand, the light diffused layer is provided as required in order to equalize the brightness by the prevention of uneven light and shade and reduction of moiré by mixing an adjacent light ray. The light diffused layer may be any suitable material layer. For example, it maybe an applied hardened layer of transparent resin with a low refractive index with transparent particles with a high refractive index dispersed therein; another applied hardened layer of transparent resin with air bubbles dispersed therein; a base material whose surface is swelled by solvent to generate crazing, a transparent resin layer with irregular asperities; or a diffused sheet with such a layer formed on a supporting base material.

The above irregular asperities can be formed by any suitable technique of a mechanical or/and chemical technique of duplicating a roughed surface shape of a roll or mold on the surface of the base material or an applied layer of transparent resin formed thereon. The above transparent particles may be one or two or more kinds of particles having average particle size of 0.5 to 30 $\mu$m such as possibly conductive inorganic particles of silica, alumina, titania, zirconia, tin oxide, indium oxide, cadmium oxide, antimony oxide, etc. or organic particles such as bridging or non-bridging polymer. The light diffused layer can also be formed on the light pipe as one or more layers at an appropriate position of the LCD display. The light diffused layer is preferably a layer with low diffusivity which does not disturb the displayed image.

In the LCD according to this invention, as illustrated, the light emitting side of the plane light source device 10 and the visual recognition side of the LCD panel 20 are bonded to each other through the adhesive layer 12 having a lower refractive index than that of the light pipe 1, 11 constituting the plane light source device so that the incident light form the incident side or its transmission light can be transmitted effectively rearward.

From the standpoint of the total reflection efficiency and the incidence efficiency of the external light due to the suppression of interface reflection, the above adhesive layer 12 has preferably a refractive index lower than that of the light pipe by 0.01 or more, particularly 0.02–0.2, more particularly 0.05–0.15. From the standpoint of actuality of balancing of the refractive index between itself and the light pipe, the adhesive layer having the refractive index of 1.48 or less is preferably combined with the light pipe having a refractive index of 1.49 or more. Further, from the standpoint of improvement of the light using efficiency due to the suppression of optical loss, the adhesive layer has preferably a full light transmittance of 90%, particularly 92%, more particularly 95% or more. Furthermore, from the standpoint of suppressing the light transmission loss and visual blooming of the displayed image, the adhesive layer has preferably a haze value of 10% or less, particularly 8% or less, more particularly 5% or less.

The thickness of the adhesive layer can be determined appropriately according to the above characteristic and bonding force. It is set at generally 10–800 $\mu$m, particularly 20–650 $\mu$m., more particularly 30–500 $\mu$m. Incidentally, any suitable bonding agent for forming the adhesive layer can be used. Its kind should not be particularly limited except the refractive index. The adhesive layer can be directly formed on the light pipe or plane light source device during bonding such as the manner of applying. From the standpoint of simplicity of working, the bonding sheet such as an adhesive sheet, gel sheet, etc. can be preferably used.

The visual recognition of the reflective index LCD according to this invention is carried out through the plane light source device arranged at the front, particularly the transmission light from the light side plane or flat plane of the light pipe as described above. Incidentally, where the reflective layer 21' is provided inside the LC cell as shown in FIG. 2, the light having been emitted from the lower surface of the light pipe 1 in a lighting mode of the plane light source device is reflected by the reflective layer 21' via the polarizer 24 and LC layer 22 and further reaches the light pipe 1 via the LC layer and polarizer again. Th display light which has passed through the long side plane A2 is visually recognized. In this case, the strong leakage light is emitted in a direction largely tilted from the front direction which is vertical to the LCD panel, and the leakage light emitting in the front direction is weak so that the displayed image with excellent quality can be visually recognized in the vicinity of the front direction.

On the other hand, in the case of the mode of the external light in which the plane light source device is not lit, the light incident from the long side plane A2 on the upper surface of the light pipe 1 passes through the polarizer, LC layer, reflective layer, etc. and reaches the conductive plate 1. The displayed image which has passed through the long side plane can be visually recognized in the vicinity of the front direction in a state with excellent display quality such as less disorder due to the light pipe. Incidentally, the plane light source device can be turned on or off in an appropriate manner.

In this invention, the optical elements or components such as the polarizer constituting the LCD panel maybe entirely or partially fixedly stacked/integrated, or may be arranged in a supportable state. From the standpoint of preventing reduction in the contrast by the suppression of interface reflection, they are preferably in the fixed state. For the fixing/sticking processing, any appropriate transparent bonding agent such as an adhesive can be used. The transparent adhesive layer may contain the transparent particle described above to provide an adhesive layer having a diffusing function. When the reflective LCD is formed, an appropriate optical element such as an antiglare layer and an antireflective film other than those described above can be arranged as required.

EMBODIMENTS

Embodiment 1

The one side surface of a polymethylmethacrylate machined in a prescribed shape (refractive index of 1.50) was cut using a diamond bite to provide a light pipe having a light emitting means. The light pipe has a width of 60 mm, depth of 80 mm, a thickness on an incident side of 1.2 mm, and an opposite end thickness of 0.6 mm. The light pipe has upper and lower flat surfaces. On the upper flat surface, successive grooves each of which is triangular in section are formed with pitches of 240 $\mu$m. The grooves each has a vertical angle has an optical path converting plane with an apex angle of 70° in parallel to the incident side and a tilt angle of 42.5°. The flat plane resides between the grooves (FIG. 2). The optical path converting plane has a width of 10–16 μm projected on the lower surface, which increases as it leaves from the incident side. The ratio in the projected area of the flat plane to optical path converting plane for the lower surface is 15/1 or more. Incidentally, the successive grooves which are triangular in section are formed from the position apart from the incident side by 2 mm.

An adhesive sheet having a thickness of 300 μm, a refractive index of 1.47, full light transmittance of 92% and a haze value of 5% was provided on the lower surface of the light pipe. A normally white reflective LCD panel is bonded to the light pipe through the bonding sheet on the visual recognition side. A cold cathode ray tube is arranged on the incident side in the width direction of the light pipe and is encircled by a light source holder of polyester film deposited with silver. Its edge is fixed by upper and lower adhesive tape at the upper and lower end of the light pipe to provide a plane light source device. Thus, a front light reflective LCD was acquired. Incidentally, the above plane light source device can be switched on/off by turning on/off a power source. The reflective LCD panel has a polarizer on the visual recognition side but does not have a color filter.

COMPARATIVE EXAMPLE

The reflective LCD defined in the first embodiment was acquired with the exception of the adhesive bonding sheet having a refractive index of 1.53 (thickness of 300 μm, transmittance of 92% and haze value of 5%).

Evaluation Test

Figure 4:
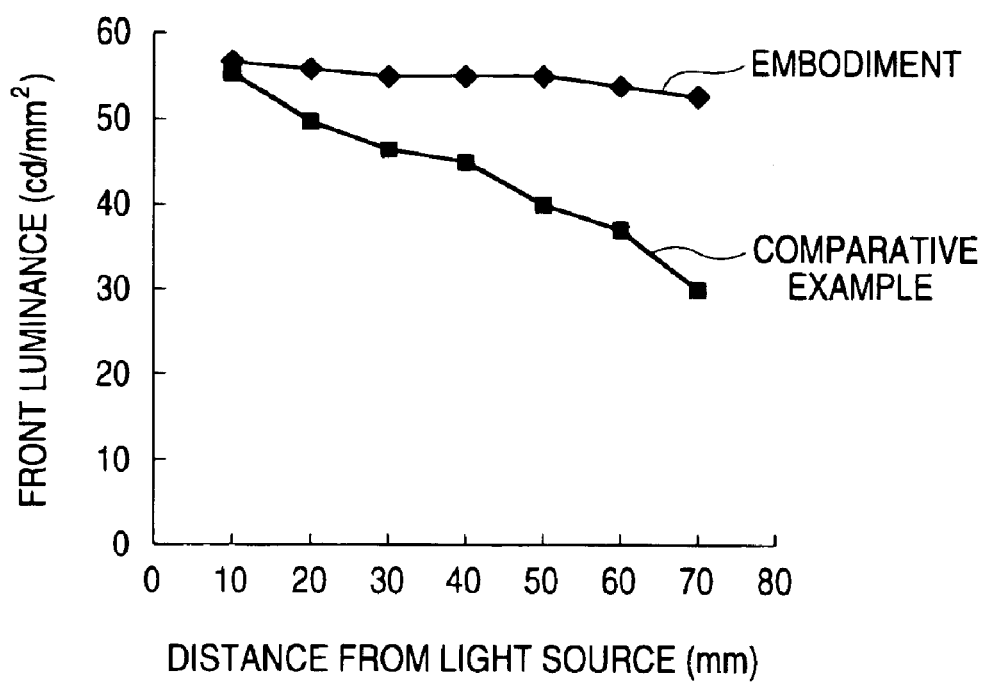
FIG. 4 is a graph showing luminance distributions.

In the reflective LCD in a white state which were provided in the first embodiment and comparative example, the plane light source was placed in the lighting mode. In this mode, the distribution of the front luminance in the depth direction on the visual recognition face at the center in the width direction of the light pipe was tested for both samples using a luminance meter (available from TOPCON Co. Ltd as BM-7). The test result is shown in FIG. 4. The front luminance at the center of the screen was 55 cd/m$^2$ in the first embodiment and 45 cd/cm$^2$ in the comparative example. It can be seen from FIG. 4 that in the first embodiment 1 in comparison to the comparative example, the luminance has uniformity with less variation on the display screen. In the external light mode, the display is not different between both samples.

Since the reflective LCD panel used in the above test has the polarizer on the visual recognition side but the color filter layer, reduction in the luminance at a farther position from the light source in the comparative example is probably attributable to the absorption loss by the polarizer. Where the reflective LCD has the color filter layer, the above reduction in the luminance is probably further amplified. Therefore, the difference in the luminance between the comparative example and this invention is probably further increased. Thus, in accordance with the embodiment of this invention, the front-light reflective LCD with good display quality can be provided which is bright on a large-scale screen and excellent in the uniformity.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflective liquid crystal display comprising:
   a plane light source device having
      (a) a light pipe including an incident side, an upper surface, and a lower surface, one of the upper and the lower surfaces having light emitting means for emitting light incident on the incident side from the other one of the upper and the lower surfaces, which constitutes a light emitting side of the plane light source device, and
      (b) a light source arranged on the incident side of said light pipe; and
   a liquid crystal display panel having a reflective layer and a visual recognition side facing said plane light source device;
   wherein the light emitting side of said plane light source device and the visual recognition side of said liquid crystal display panel are bonded to each other through an adhesive layer, such that no air layer is interposed between said plane light source device and said liquid crystal display panel, and wherein said adhesive layer has a refractive index that is lower than refractive index of said light pipe.

2. A reflective liquid crystal display according to claim 1, wherein the refractive index of said light pipe is 1.49 or more and the refractive index of said adhesive layer is 1.48 or less.

3. A reflective liquid crystal display according to claim 1, wherein said adhesive layer has a full light transmittance of 90% or more.

4. A reflective liquid crystal display according to claim 1, wherein said adhesive layer has a haze value of 10% or less.

5. A reflective liquid crystal according to claim 1, wherein said light emitting means is provided on the upper surface of the light pipe, and in a plane that is perpendicular to both reference planes of the lower surface and the incident side, an emitting light from the lower surface has a maximum strength in a direction within 30° from a normal line to the reference plane of the lower surface.

6. A reflective liquid crystal display according to claim 1, wherein said light emitting means is provided on the upper surface of the light pipe, and said light emitting means is composed of a plurality of asperities triangular in section each of which has an optical path converting plane with a tilt angle of 35–48° from a reference plane of the lower surface.

7. A reflective liquid crystal display according to claim 1, wherein said light emitting means is provided on the upper surface of the light pipe, and said light emitting means is a repetitive structure of prism-like asperities arranged at pitches of 50 μm–1.5 mm, each asperity composed of an optical path converting plane and a long side plane,
   wherein said optical path converting plane has a slope that tilts down at angle of 35–48° from a reference plane of the lower surface from the incident side toward an opposite end of the light pipe and has a projected width on the reference plane of 40 μm or less, and
   wherein said long side plane has a slope that tilts at an angle of 0–10° from the reference plane, and has a projected width on the reference plane which is five or more time as long as the projected width of the optical path converting plane, a difference in angle over all long sides being within a range of 5° and a difference in angle to a nearest long side being within 1°.

8. A reflective liquid crystal display according to claim 6, wherein said asperities have ridges that extend in a direction that is within a range of ±30° from a reference plane of the incident side.

* * * * *

UNITED STATES PATENT AND TRADEMARK OFFICE
CERTIFICATE OF CORRECTION

PATENT NO.   : 6,866,393 B2
DATED        : March 15, 2005
INVENTOR(S)  : Shuuji Yano and Seiji Umemoto It is certified that error appears in the above-identified patent and that said Letters Patent is hereby corrected as shown below:

Column 12,
Lines 1-23, claim 1 should be corrected as follows:
    1. A reflective liquid crystal display comprising:
    a plane light source device having
    (a) a light pipe including an incident side, an upper surface, and a lower surface, one of the upper and the lower surfaces having light emitting means for emitting light incident on the incident side from the other one of the upper and the lower surfaces, which constitutes a light emitting side of the plane light source device, and
    (b) a light source arranged on the incident side of said light pipe; and
    a liquid crystal display panel having a reflective layer, and a polarizer formed on a visual recognition side of said liquid crystal display panel which faces said plane light source device;
    wherein the light emitting side of said plane light source device and the visual recognition side of said liquid crystal display panel are bonded to each other through an adhesive layer, such that no air layer is interposed between said plane light source device and said liquid crystal display panel, and wherein said adhesive layer has a refractive index that is lower than refractive index of said light pipe.

Signed and Sealed this

Thirtieth Day of August, 2005

JON W. DUDAS
*Director of the United States Patent and Trademark Office*